United States Patent
Kuik et al.

(10) Patent No.: US 10,733,011 B2
(45) Date of Patent: Aug. 4, 2020

(54) DATA SUPPRESSION FOR FASTER MIGRATION

(71) Applicant: Cisco Technology, Inc., San Jose, CA (US)

(72) Inventors: Timothy Kuik, Lino Lakes, MN (US); David Thompson, Rogers, MN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/133,401

(22) Filed: Sep. 17, 2018

(65) Prior Publication Data
US 2019/0034225 A1 Jan. 31, 2019

Related U.S. Application Data

(63) Continuation of application No. 14/815,650, filed on Jul. 31, 2015, now Pat. No. 10,083,062.

(51) Int. Cl.
*G06F 9/48* (2006.01)
*G06F 3/06* (2006.01)
*G06F 9/455* (2018.01)

(52) U.S. Cl.
CPC .......... *G06F 9/4856* (2013.01); *G06F 3/064* (2013.01); *G06F 3/067* (2013.01); *G06F 3/0608* (2013.01); *G06F 3/0613* (2013.01); *G06F 3/0641* (2013.01); *G06F 3/0647* (2013.01); *G06F 3/0661* (2013.01); *G06F 9/45558* (2013.01); *G06F 2009/4557* (2013.01)

(58) Field of Classification Search
CPC .. G06F 9/4856; G06F 3/0641; G06F 9/45558; G06F 3/067; G06F 3/0661; G06F 3/0647; G06F 3/064; G06F 3/0613; G06F 3/0608; G06F 2009/4557

See application file for complete search history.

(56) References Cited

U.S. PATENT DOCUMENTS

| | | | | |
|---|---|---|---|---|
| 2012/0005675 A1* | 1/2012 | de Waal | ............... | G06F 9/45558 718/1 |
| 2012/0084445 A1* | 4/2012 | Brock | ................... | G06F 9/5077 709/226 |
| 2013/0275447 A1* | 10/2013 | Ben-Tsion | .............. | G06F 3/061 707/756 |
| 2014/0196037 A1 | 7/2014 | Gopalan | | |

* cited by examiner

*Primary Examiner* — Sisley N Kim
(74) *Attorney, Agent, or Firm* — Polsinelli PC

(57) ABSTRACT

The subject technology addresses the need in the art for improving intra-cloud migration of virtual machines in a cloud computing environment. A hash database may be prepopulated with key-value pairs corresponding to hash IDs and associated data chunks of a virtual machine image. In this regard, the virtual machine image may be divided into chunks using boundaries chosen by a Rabin fingerprinting technique. A hash (e.g., MD5 or SHA-1) may be computed over each chunk and act as a unique identifier for the data contained in each chunk. At appropriate times, one or more hash IDs are sent instead of the actual data chunks between clouds when performing the inter-cloud migration of a virtual machine.

21 Claims, 8 Drawing Sheets

DATA SUPPRESSION FOR FASTER MIGRATION

CROSS-REFERENCE TO RELATED APPLICATIONS

This application is a continuation of U.S. application Ser. No. 14/815,650 filed on Jul. 31, 2015, the content of which is incorporated by reference in its entirety.

BACKGROUND

Virtualization is a technology that allows one computer to do the job of multiple computers by sharing resources of a single computer across multiple systems. Through the use of virtualization, multiple operating systems and applications can run on the same computer at the same time, thereby increasing utilization and flexibility of hardware. Virtualization allows servers to be decoupled from underlying hardware, thus resulting in multiple virtual machines sharing the same physical server hardware. The virtual machines may move between servers based on traffic patterns, hardware resources, or other criteria. Migrating a VM may require the transfer of the VM image itself, which can be quite time consuming. The speed and capacity of today's servers allow for a large number of virtual machines on each server, and in large data centers there may also be a large number of servers.

In the context of information technology, cloud computing is a model of service delivery (e.g., instead of a product) for providing on-demand access to shared computing resources (e.g., networks, network bandwidth, servers, processing, memory, storage, applications, virtual machines, virtual appliances, and services) that can be provisioned with very little management effort or interaction with a provider of the service. In some instances, cloud infrastructure ("cloud") may be deployed as a public, private or hybrid cloud. By way of example, in a private cloud, the cloud infrastructure is operated solely for an entity, and may be managed by the entity (or third party). In a public cloud, the cloud infrastructure may be made available to the general public (or another large set of users) and is operated by an entity providing cloud services. In a hybrid cloud, the cloud infrastructure includes at least two clouds (e.g., private and/or public) that are separate but connected by technology that enables data and/or application interoperability.

BRIEF DESCRIPTION OF THE DRAWINGS

The embodiments of the present technology will hereinafter be described in conjunction with the appended drawings, provided to illustrate and not to limit the technology, wherein like designations denote like elements, and in which.

DETAILED DESCRIPTION

Figure 1:
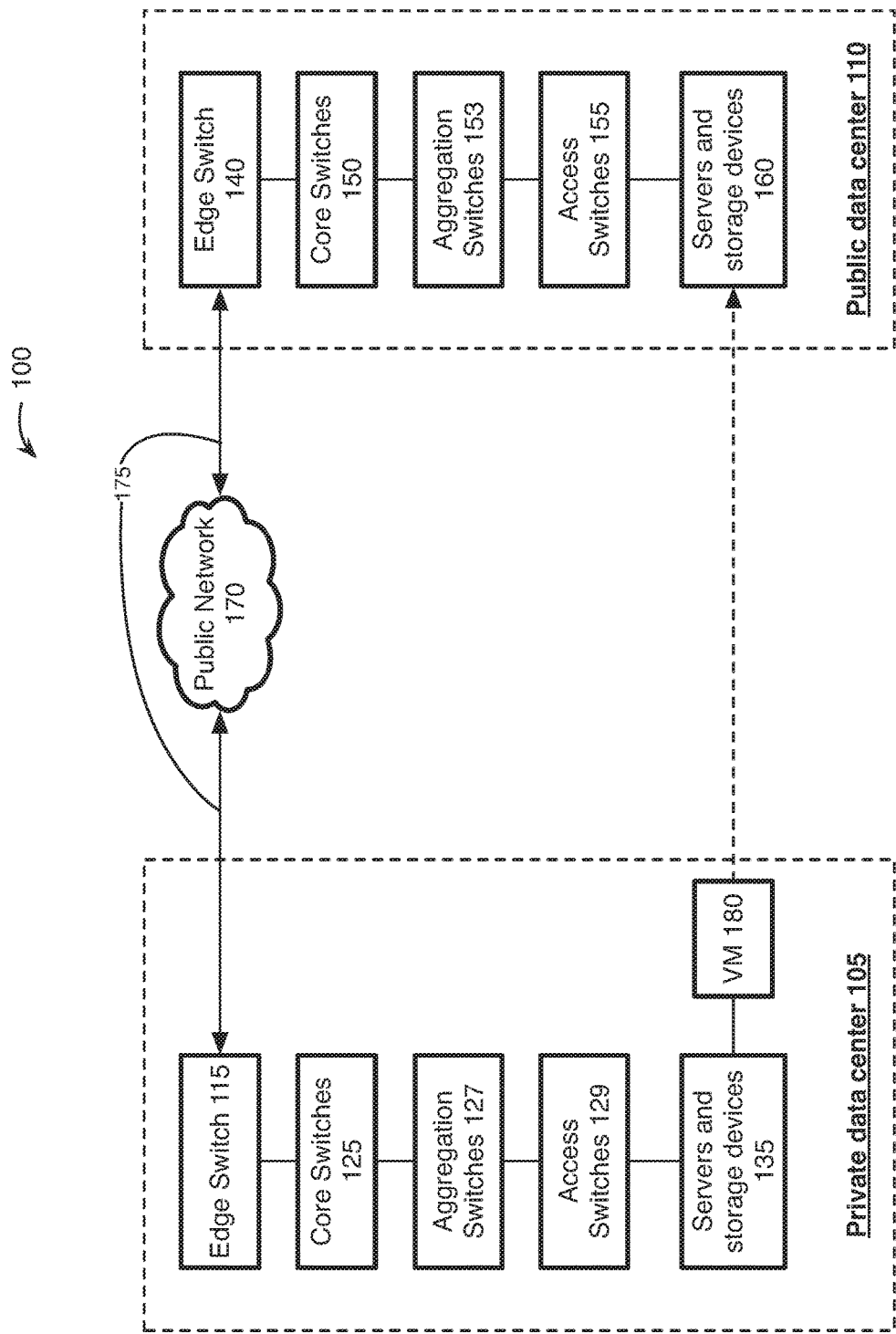
FIG. 1 conceptually illustrates an example system for a multiple data center environment in accordance with at least one embodiment.

Systems and methods in accordance with various embodiments of the present disclosure may overcome one or more deficiencies experienced in existing approaches to migrating virtual machines.

Overview

Embodiments of the subject technology provide for selecting a first data chunk from a virtual machine image, the virtual machine image being divided into a plurality of data chunks; computing a hash identifier (ID) value for the first data chunk; determining whether the hash ID value is included as part of an entry in a hash database, the entry including at least the hash ID value associated with the first data chunk; and responsive to the hash ID value being included as part of the entry, sending the hash ID value to a receiving data center as part of a migration process for the virtual machine image.

Description of Example Embodiments

The disclosed technology addresses the need in the art for improving migration of virtual machines in a computing environment. More specifically, the disclosed technology addresses the need in the art for data suppression for faster migration of virtual machines.

Examples of Using Data Suppression for Virtual Machine Migration

Embodiments provide a way of migrating images of virtual machines between different cloud deployments (e.g., public, private, hybrid, etc.). By using data suppression techniques described further herein, network resource usage and the time to transfer may be reduced for this migration process.

Data centers may host applications and store large amounts of data for an organization or multiple organizations. An enterprise data center or "cloud" may be privately owned and discreetly provide services for a number of customers, with each customer using data center resources by way of private networks, e.g., virtual private networks (VPNs). In some instances, the (private) enterprise data center may communicate with a public data center, forming a hybrid cloud environment.

In embodiments described further herein, an inter-cloud migration of a virtual machine(s) from a private data center to a public data center (or vice versa) may occur. Virtual machine migration allows a given data center to move a virtual machine in order to accommodate changes in application demand, and to reduce resource consumption on physical machines that host virtual machines when these physical machines become overloaded. The virtual machine migration process involves, among other operations, discovering available resources on available physical machines, deciding on which virtual machines to migrate and where, and then performing the actual movement of a virtual machine image from one physical machine to another (e.g., in another data center), by transferring at least a portion of a virtual machine image over the network, including its static as well as the live (e.g., run-time) state. A virtual machine image may include data corresponding to an operating system that the virtual machine runs on, any applications that are included as part of the virtual machine configuration, and/or the run-time state of the virtual machine.

Example Network Environment

FIG. 1 conceptually illustrates an example system 100 for a multiple data center environment. As shown, system 100 includes a private data center 105 (e.g., a private cloud) and a public data center 110 (e.g., public cloud). The two data centers 105 and 110 communicate with each other using edge switches 115 and 140, respectively, by way of interconnect links 175 over public network 170. The data centers 105 and 110 include multiple servers and storage devices 135 and 160. The servers may host application services (e.g., World Wide Web server applications or remotely hosted virtual machine (VM) applications). The storage devices may be part of a Storage Area Network (SAN) in an embodiment. Collectively, the system 100 may be understood as a hybrid cloud configuration.

In an embodiment, each of the data centers 105 and 110 include access switches, aggregation switches and core switches shown at reference numerals 129, 127, 125, and 155, 153, and 150, respectively, to aggregate and distribute ingress (e.g., upstream traffic), and egress (e.g., downstream traffic). Multiple switches may be provided at each access, aggregation, and core level to provide redundancy within the data centers 105 and 110. In this example, a single virtual machine (VM) 180 has been selected for VM migration from data center 105 to data center 110. The migration of VM 180 may be triggered by operational constraints and/or events (e.g., server overload, scheduled maintenance or downtime, etc.) in the data center 105. VM migration may be understood as the process of moving a VM from one host or storage location to another, and in the context of embodiments described herein, involve moving a VM from one data center to another data center.

In an example, VM migration may be performed at the data link layer, (e.g., Layer 2 of the Open Systems Interconnect (OSI) model), for inter-cloud computing operations. When the VM 180 is part of a local area network (LAN) and is migrated between data centers, the LAN may be connected by a LAN extension through a wide area network (WAN) or public network 170 (e.g., the Internet, as part of a Layer 3 VPN). LAN extension may be understood as a technology that enables respective LAN entities (e.g., network nodes) in different data centers to communicate with each other by treating the underlying network as a single LAN.

In the example shown in FIG. 1, the migration of VM 180 from servers and storage 135 to 160 is logically represented by the dashed line between data centers 105 and 110. It should be understood that the actual migration occurs over network 170 by way of the switches (or edge devices) in the data centers 105 and 110 in an embodiment.

In an embodiment, the storage devices 135 and 160 may include prepopulated data for one or more operating system images (among other types of data). During the migration of the VM 180, any known data (e.g., found in the prepopulated data) is not sent over the public network 170. As described further herein, data suppression and compression techniques may be used to speed up (e.g., decrease an amount of time for) transfer of images between cloud deployments. A virtual machine image (e.g., raw blocks) may be divided into chunks using boundaries chosen by a Rabin fingerprinting technique. A hash (e.g., MD5 or SHA-1) may be computed over each chunk and used as an unique identifier for the data contained in each chunk. At appropriate times, one or more identifiers are sent instead of the actual data chunk(s) between clouds when performing the inter-cloud migration.

In an embodiment, a database (or other collection of information) may be provided in each cloud deployment. Such a database may be pre-populated with hash identifiers and associated values for each version of an operating system that may be provided (e.g., that is used or included as part of a respective virtual machine image). When a matching entry is found in the database, the hash identifier will be sent instead of the data chunk(s) by the first cloud and the receiving second cloud will use the hash identifier to locate the data chunk(s) in its database to replace the hash identifier received. Any data chunk(s) not located in the database using the hash identifier will be sent compressed by the first cloud to further speed up the transfer to the second cloud. Further, the respective databases in each cloud deployment may be used to "learn" any missed hash/chunk entries and, as a result, potentially speeding up additional transfers of similar virtual machine images that are deployed.

Figure 2:
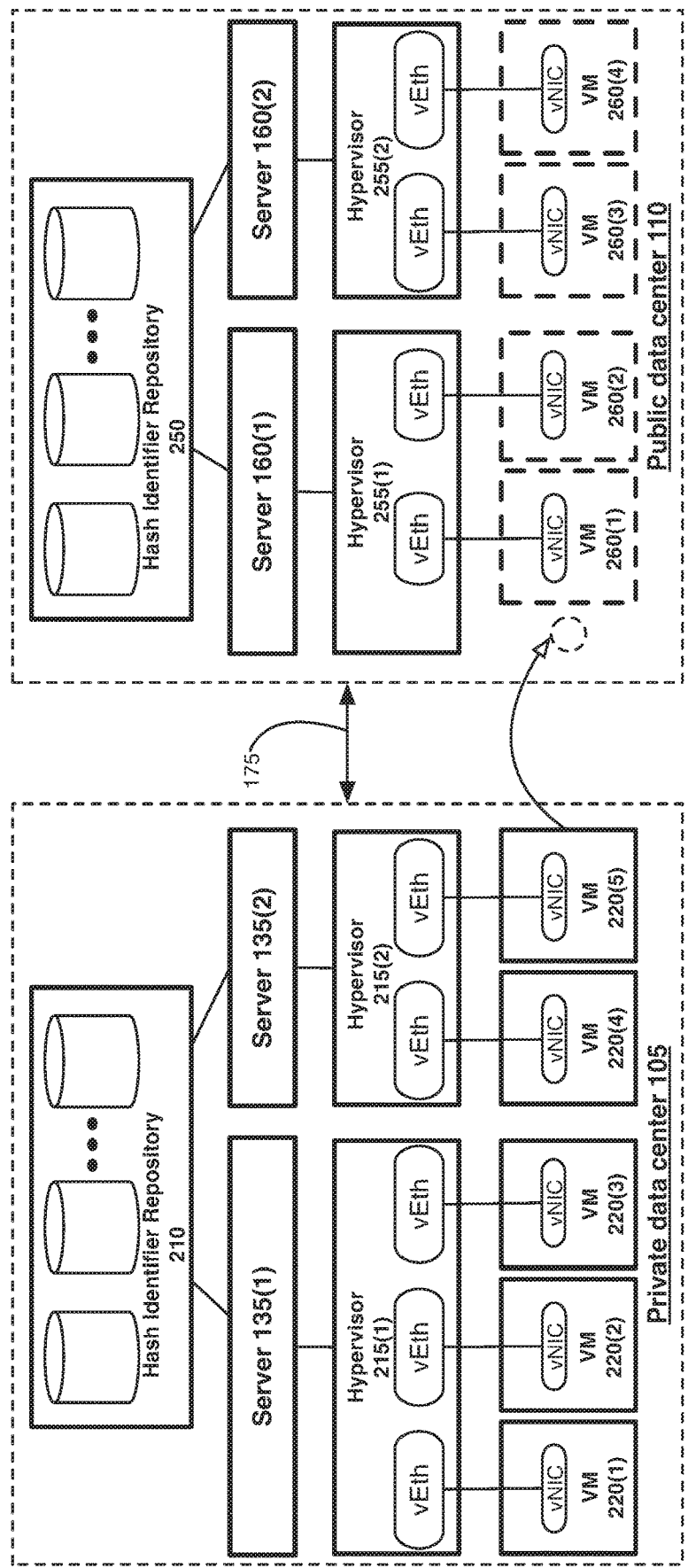
FIG. 2 is an example of a conceptual diagram of portions of the multiple data center environment from FIG. 1 in accordance with at least one embodiment.

FIG. 2 is an example of a conceptual diagram of portions of the multiple data center environment from FIG. 1. The relevant portions of data centers 105 and 110 are shown as indicated by the dashed boxes, along with the interconnect links 175 that enable communication between the data centers over a public network (not shown). In the illustrated example, two of the servers 135(1) and 135(2) from data center 105 are shown along with two of the servers 160(1) and 160(2) from the data center 110.

The servers 135(1), 135(2), 160(1) and 160(2) are shown along with their associated hypervisors 215(1), 215(2), 255(1), and 255(2), respectively. Hypervisors 215(1) and 215(2) support multiple VMs 220(1)-220(5). VMs 220(1)-220(5) may provide one or more private networks in a private cloud. Similarly, hypervisors 255(1) and 255(2) support multiple VMs 260(1)-260(4). VMs 260(1)-260(4) have been previously migrated from one or more private networks (e.g., as indicated by the dashed lines). Hypervisors may be understood as hardware and/or software abstraction layers that provide operating system independence for applications and services provided by VMs.

In an embodiment, hypervisors 215(1), 215(2), 255(1), and 255(2) perform the functionality of a virtual switch for connecting to one or more virtual machines, and enabling local switching between different virtual machines within the same server. A virtual switch enables virtual machines to connect to each other and to connect to parts of a network. As illustrated, each hypervisor may provide one or more Virtual Ethernet (vEthernet or vEth) interfaces in which each vEthernet interface corresponds to a switch interface that is connected to a virtual port. Each of the virtual machines 220(1)-220(5) and VMs 260(1)-260(4) may include a virtual Network Interface Cards (vNIC) that are connected to a virtual port of a respective vEthernet interface provided by their associated hypervisor.

In the illustrated example, VM 220(5) is targeted for migration from the private cloud/data center 105 to the public cloud/data center 110, (e.g., due to conditions or downtime experienced in the private cloud). It may be determined that the server 160(1) provides sufficient resources to support the migrated VM 220(5). This migration of the VM 220(5) may involve respective hash identifier repositories at the private data center 105 and the public data center 110. As shown in FIG. 2, the private data center 105 may include hash identifier repository 210. Similarly, the data center 110 may include hash identifier repository 250. Each of the hash identifier repositories may include a respective mechanism for managing at least a portion of hash database (or similar collection of information) for use in migrating virtual machine image(s) as described further herein. In at least one embodiment, the mechanism may be configured to provide hash identifiers for block level data of supported operating systems and/or applications using at least one or more different block storage protocols (e.g., iSCSI, SCSI, ATA, SAS/SATA, IDE, etc.). Although the examples described herein relate to migration of virtual machines from a private data center to a public data center, it is appreciated that migration of virtual machines from a public data center to a private data center could also occur. Further, it is contemplated that migration of virtual machines from one public data center to another public data center may occur, and that migration of virtual machines from one private data center to another private data center may occur.

As mentioned before, a virtual machine image may be divided into chunks using boundaries chosen by a Rabin fingerprinting technique. A hash (e.g., MD5 or SHA-1) may be computed over each chunk and act as a unique identifier for the data contained in each chunk. At appropriate times, one or more identifiers are sent instead of the actual chunk data between clouds when performing the inter-cloud migration of a virtual machine.

In one data suppression technique, sequential block data for a virtual machine image may be divided into chunks using boundaries chosen by specifically selected fingerprints using a technique such as, for example, the Rabin fingerprint technique. Once the block data has been divided into chunks, a respective hash value or hash ID may be computed (using, for example, hash algorithms such as MD5 and/or SHA-1) for each chunk. The hash ID provides a unique identifier for the data contained in its associated chunk. Redundant data may then be suppressed by using the hash ID to refer to the data rather than the raw data itself.

Any hash ID that is received by the public data center 110 may then be used to locate corresponding data chunks in the hash identifier repository 250. For example, if a hash ID is sent corresponding to a data chunk in the virtual machine image for the VM 220(5), the server 160(1) may retrieve the corresponding data chunk by using the received hash identifier on a hash database provided in the hash identifier repository 250.

Figure 3:
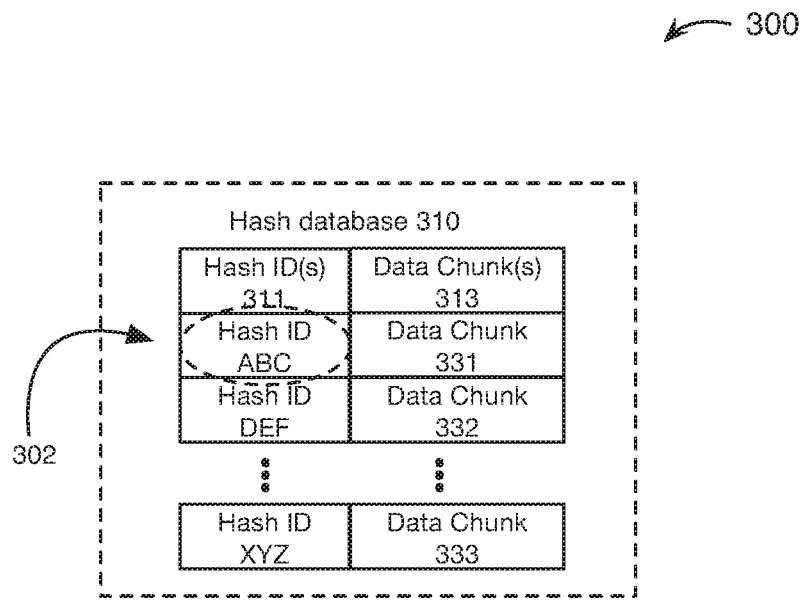
FIG. 3 illustrates a conceptual diagram of an example a hash database portion which may be used for implementing at least one embodiment.

FIG. 3 illustrates a conceptual diagram of an example a hash database portion 300 which may be used for implementing at least one embodiment. As illustrated in the embodiment of FIG. 3, the hash database portion 300 is stored as part of a respective hash identifier repository described above, and may be implemented using hash database 310. The hash database portion 300, in this example, may be part of the hash identifier repository 210 in the private data center 105.

In the example of FIG. 3, each entry (e.g., 302) in the hash database 310 may represent a respective Hash ID and data chunk pair. Each entry (e.g., 302) in the hash database 310 may include different fields relating to various data parameters including, for example: a Hash ID field 311 which includes a Hash ID value for uniquely identifying an associated data chunk; and a Data Chunk field 313 which may include one or more bytes from the data chunk (e.g., one of data chunks 331, 332, or 333) associated with the Hash ID value. The Hash ID value, in an example, would be a key generated using a hash function and the associated Data Chunk (e.g., the actual bytes of data) would be a value associated with the key, which are determined for each data chunk of the virtual machine image to prepopulate the hash database 310 with key-value pairs. This eliminates the need to dynamically build up the hash database 310 and/or use more network bandwidth. By implementing the hash database 310 in this fashion, it also allows leveraging common items that may exist between related operating systems. Respective hash databases may be provided in the private data center 105 and the public data center 110 (e.g., in the hash identifier repositories 210 and 250).

As illustrated in FIG. 3, the hash database 310 may be configured to include, for each entry (e.g., 302), respective pairs of values for computed Hash ID values to their associated raw data chunks 330, 331, and 332. The raw data chunks 330, 331, and 332 may be stored in local memory or storage of a virtual machine host (e.g., server) in an embodiment. It is appreciated that the number of data chunks, hash IDs, and entries in the hash database 310 are shown for the sake of discussion of examples in FIG. 3 and that any number of data chunks, hash IDs, and/or entries may be supported by embodiments described herein.

In an embodiment, the hash database 310 may be used to transfer hash IDs corresponding to data chunks of a virtual machine image as part of a virtual machine migration process. Each data chunk of the virtual machine image may be sequentially selected for searching within the hash database to locate its corresponding hash ID. For example, for a selected data chunk, the hash database may be searched for an entry that corresponds to the selected data chunk (e.g., based on a computed hash ID). If located in the hash database, instead of sending the data itself, the corresponding hash ID is transferred as part of the migration process. A selected data chunk that is not represented in the hash database based on its hash ID may be compressed for transferring over the public network to the receiving data center.

Example Processes

Figure 4:
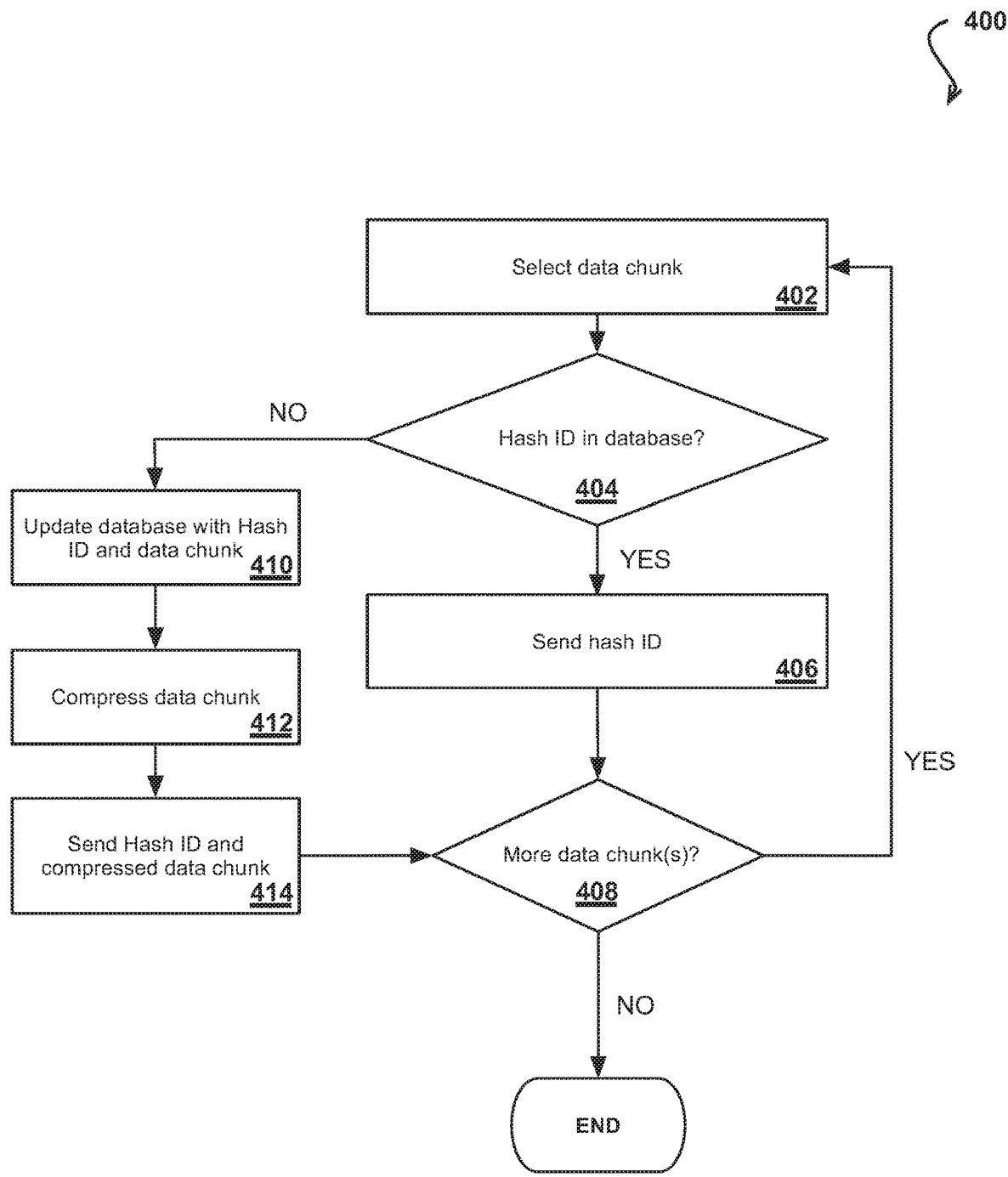
FIG. 4 conceptually illustrates an example process in accordance with at least one embodiment.

FIG. 4 conceptually illustrates an example process 400 in accordance with at least an embodiment of the subject technology. Referring to FIGS. 1 and 2, the process 400 described below may be performed by a server hosting a virtual machine in a data center as part of a migration process for a virtual machine. In another example, the process 400 may be performed by an edge device such as the edge switch in the private data center 105. As part of the migration process, respective data chunks of a virtual machine image may be selected in a sequential manner for locating within a hash database based on respective hash IDs. During a migration, respective data chunks of a virtual machine image may be pushed to the destination data center. Using the data suppression techniques described herein, hash IDs and/or compressed data may be sent instead of the raw data chunks. As mentioned before, a hash database may be prepopulated with key-value pairs in which each key-value pair includes a hash ID value and an associated data chunk. Data chunks from the virtual machine image may be migrated as discussed in the following example of FIG. 4.

At step 402, a data chunk is selected from a virtual machine image. In an example, the data chunks of the virtual machine image may be selected in a sequential manner. At step 404, a hash ID value is computed for the selected data chunk and searched in a hash database in an attempt to locate the hash ID value. Any appropriate hash function may be used to compute the hash ID value. If the hash ID value is located in the hash database, at step 406, the hash ID value is sent over a network to a receiving data center (e.g., the public data center 110 in FIG. 1). The hash ID may therefore be then sent instead of a raw data chunk and, thus, network resources are conserved. In an example, an LBA of the selected data chunk is also sent to the receiving data center in which the LBA may be the next LBA address following a previous LBA address for a previously selected data chunk (e.g., one that has already been migrated as part of the migration process). Once received at the receiving data center, the hash ID value may be looked up in its hash database, and if located, the associated data chunk may be retrieved and written in a disk location based on the received LBA.

However, if it is determined that the hash ID value is not in the hash database, at step 410, the hash database is updated with a new entry including a key-value pair with the hash ID value and the selected data chunk. At step 412, the selected data chunk is compressed using one or more suitable compression techniques (e.g., Limpel Zif Stac (LZS), Predictor, Point-to-Point Protocol (PPP), X.25 payload compression, etc.). At step 414, the hash ID value and the compressed data are sent, over a network, to a receiving data center. Further, as discussed before, an LBA of the selected data chunk may also be sent over to the receiving data center. In this manner, the compressed data, hash ID value and/or LBA information may be then sent over the network to the receiving data center instead of the raw (uncompressed) data chunks and, thus, network resources are conserved. After being received by the receiving data center, the compressed data may be uncompressed into a raw data chunk and then written with the hash ID value as a new key-value pair entry in the respective hash database of the receiving data center. The data chunk may be written to a location of a disk based on the LBA at the receiving data center.

At step 408, a determination is made if more data chunk(s) are remaining for processing in the virtual machine image (e.g., either after sending the hash ID value in step 406, or after sending the hash ID value and the compressed data chunk in step 414). If at least one data chunk remains, the process 400 may return to step 402 to select the next data chunk and repeat the aforementioned steps described above in the process 400.

Example Devices, Systems and Architectures

Figure 5:
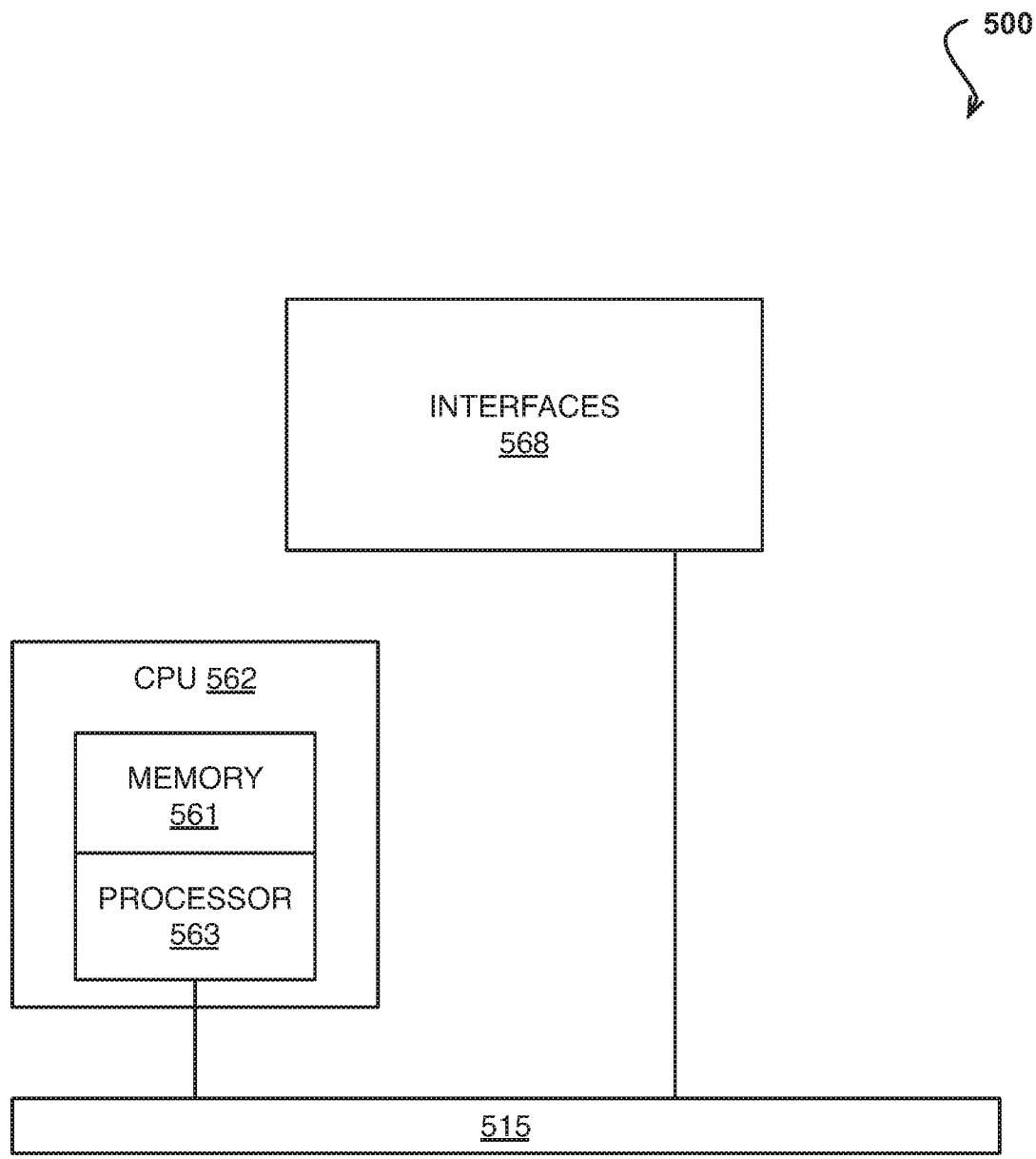
FIG. 5 illustrates an example network device according to some aspects of the subject technology.

FIG. 5 illustrates an exemplary network device 500 suitable for implementing the present invention. Network device 500 includes a master central processing unit (CPU) 562, interfaces 568, and a bus 515 (e.g., a PCI bus). When acting under the control of appropriate software or firmware, the CPU 562 is responsible for executing packet management, error detection, and/or routing functions, such as miscabling detection functions, for example. The CPU 562 preferably accomplishes all these functions under the control of software including an operating system and any appropriate applications software. CPU 562 may include one or more processors 563 such as a processor from the Motorola family of microprocessors or the MIPS family of microprocessors. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6A:
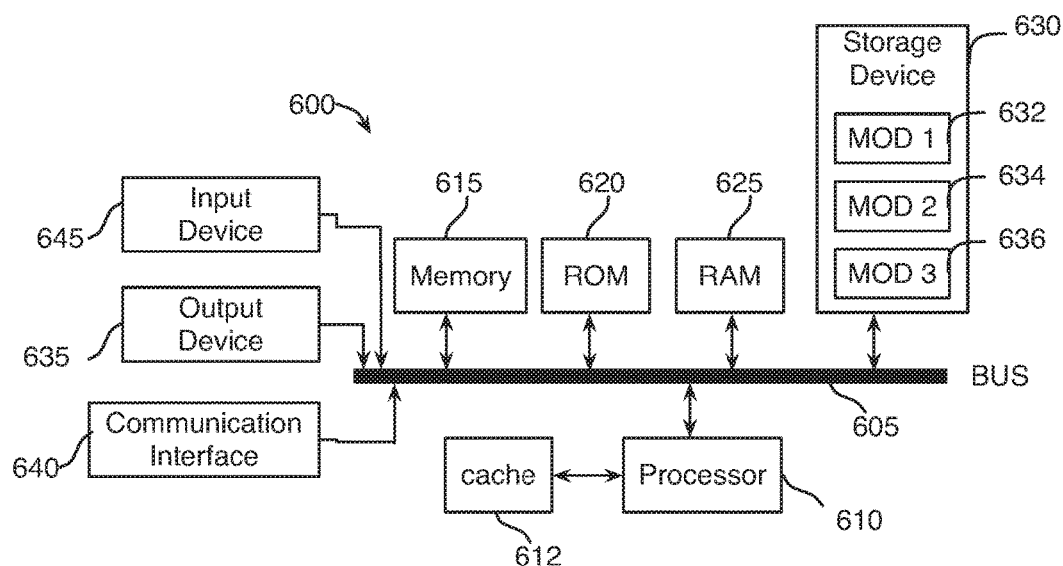
FIGS. 6A and 6B illustrate example system embodiments according to some aspects of the subject technology.
Figure 6B:
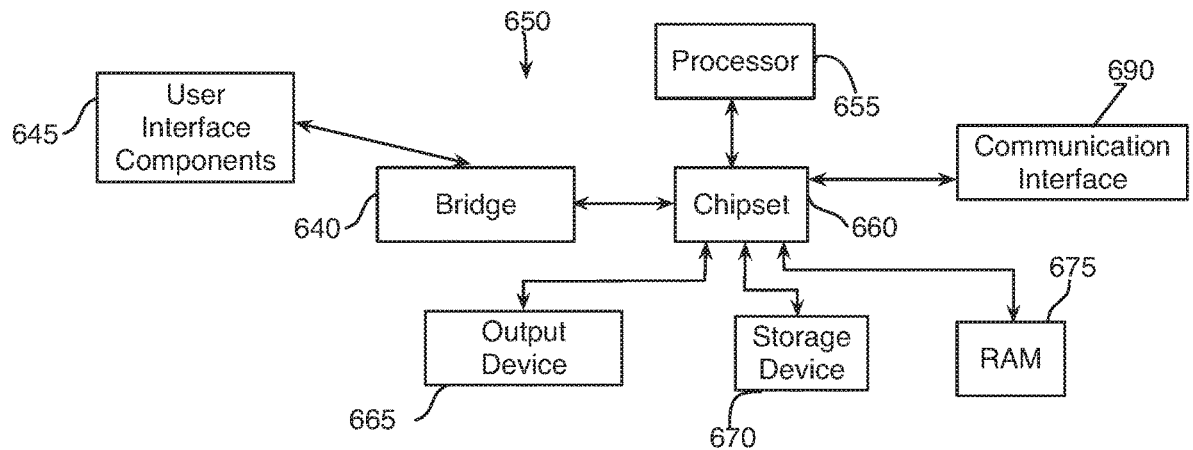

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 640 for interfacing with a variety of user interface components 645 can be provided for interfacing with chipset 660. Such user interface components 645 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 645 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

Figure 7:
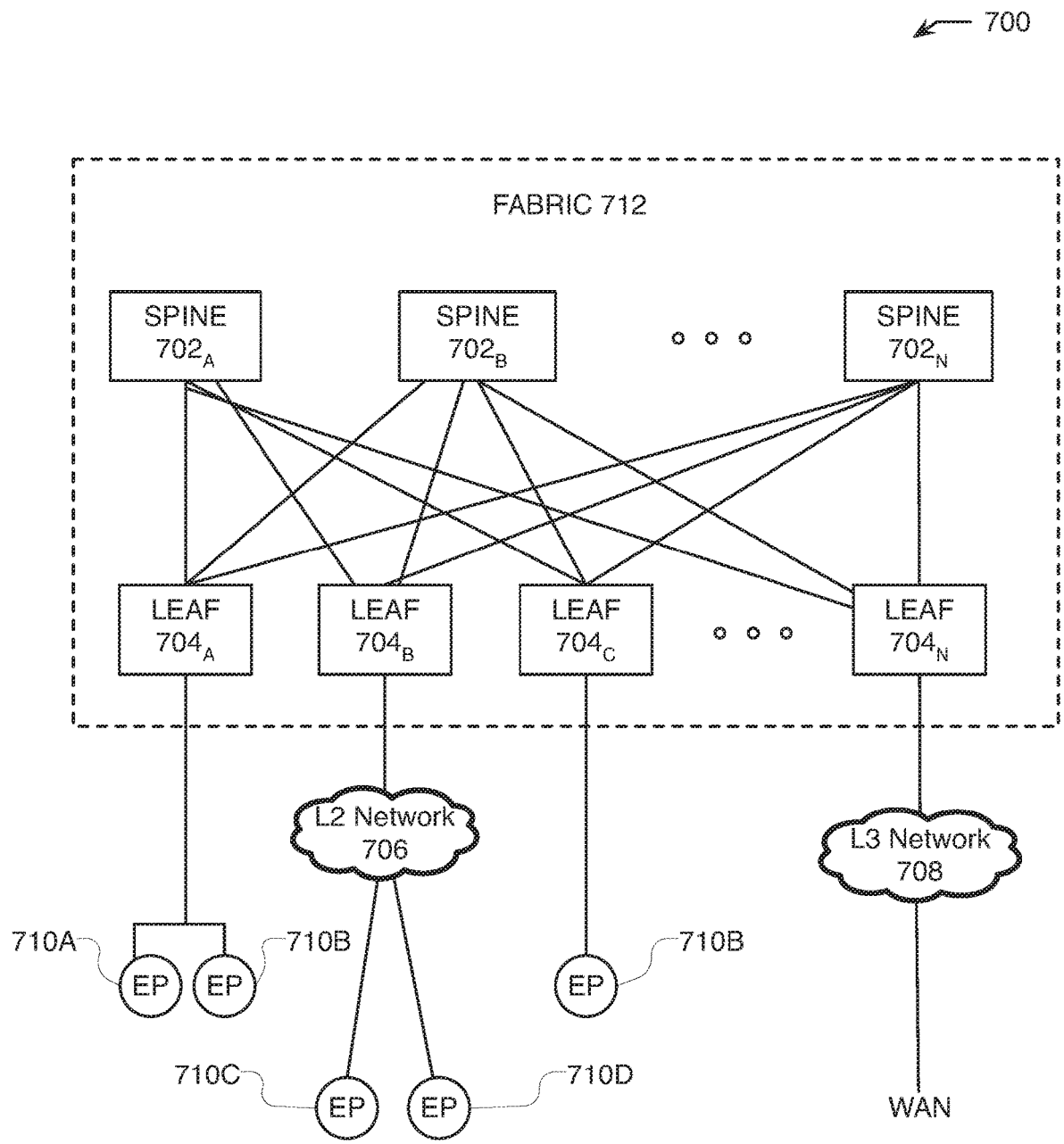
FIG. 7 illustrates a schematic block diagram of an example architecture for a network fabric.

FIG. 7 illustrates a schematic block diagram of an example architecture 700 for a network fabric 712. The network fabric 712 can include spine switches 702A, 702B, . . . , 702N (collectively "702") connected to leaf switches 704A, 704B, 704C, . . . , 704N (collectively "704") in the network fabric 712.

Spine switches 702 can be L3 switches in the fabric 712. However, in some cases, the spine switches 702 can also, or otherwise, perform L2 functionalities. Further, the spine switches 702 can support various capabilities, such as 40 or 10 Gbps Ethernet speeds. To this end, the spine switches 702 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 702 can be configured to host a proxy function that performs a lookup of the endpoint address identifier to locator mapping in a mapping database on behalf of leaf switches 704 that do not have such mapping. The proxy function can do this by parsing through the packet to the encapsulated, tenant packet to get to the destination locator address of the tenant. The spine switches 702 can then perform a lookup of their local mapping database to determine the correct locator address of the packet and forward the packet to the locator address without changing certain fields in the header of the packet.

When a packet is received at a spine switch 702*i*, the spine switch 702*i* can first check if the destination locator address is a proxy address. If so, the spine switch 702*i* can perform the proxy function as previously mentioned. If not, the spine switch 702*i* can lookup the locator in its forwarding table and forward the packet accordingly.

Spine switches 702 connect to leaf switches 704 in the fabric 712. Leaf switches 704 can include access ports (or non-fabric ports) and fabric ports. Fabric ports can provide uplinks to the spine switches 702, while access ports can provide connectivity for devices, hosts, endpoints, VMs, or external networks to the fabric 712.

Leaf switches 704 can reside at the edge of the fabric 712, and can thus represent the physical network edge. In some cases, the leaf switches 704 can be top-of-rack ("ToR") switches configured according to a ToR architecture. In other cases, the leaf switches 704 can be aggregation switches in any particular topology, such as end-of-row (EoR) or middle-of-row (MoR) topologies. The leaf switches 704 can also represent aggregation switches, for example.

The leaf switches 704 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 704 can contain virtual switching functionalities, such as a virtual tunnel endpoint (VTEP) function as explained below in the discussion of VTEP 808 in FIG. 8. To this end, leaf switches 704 can connect the fabric 712 to an overlay network, such as overlay network 800 illustrated in FIG. 8.

Network connectivity in the fabric 712 can flow through the leaf switches 704. Here, the leaf switches 704 can provide servers, resources, endpoints, external networks, or VMs access to the fabric 712, and can connect the leaf switches 704 to each other. In some cases, the leaf switches 704 can connect EPGs to the fabric 712 and/or any external networks. Each EPG can connect to the fabric 712 via one of the leaf switches 704, for example.

Endpoints 710A-E (collectively "710") can connect to the fabric 712 via leaf switches 704. For example, endpoints 710A and 710B can connect directly to leaf switch 704A, which can connect endpoints 710A and 710B to the fabric 712 and/or any other one of the leaf switches 704. Similarly, endpoint 710E can connect directly to leaf switch 704C, which can connect endpoint 710E to the fabric 712 and/or any other of the leaf switches 704. On the other hand, endpoints 710C and 710D can connect to leaf switch 704B via L2 network 706. Similarly, the wide area network (WAN) can connect to the leaf switches 704C or 704D via L3 network 708.

Endpoints 710 can include any communication device, such as a computer, a server, a switch, a router, etc. In some cases, the endpoints 710 can include a server, hypervisor, or switch configured with a VTEP functionality which connects an overlay network, such as overlay network 400 below, with the fabric 712. For example, in some cases, the endpoints 710 can represent one or more of the VTEPs 808A-D illustrated in FIG. 8. Here, the VTEPs 808A-D can connect to the fabric 712 via the leaf switches 704. The overlay network can host physical devices, such as servers, applications, EPGs, virtual segments, virtual workloads, etc. In addition, the endpoints 710 can host virtual workload(s), clusters, and applications or services, which can connect with the fabric 712 or any other device or network, including an external network. For example, one or more endpoints 710 can host, or connect to, a cluster of load balancers or an EPG of various applications.

Although the fabric 712 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 8:
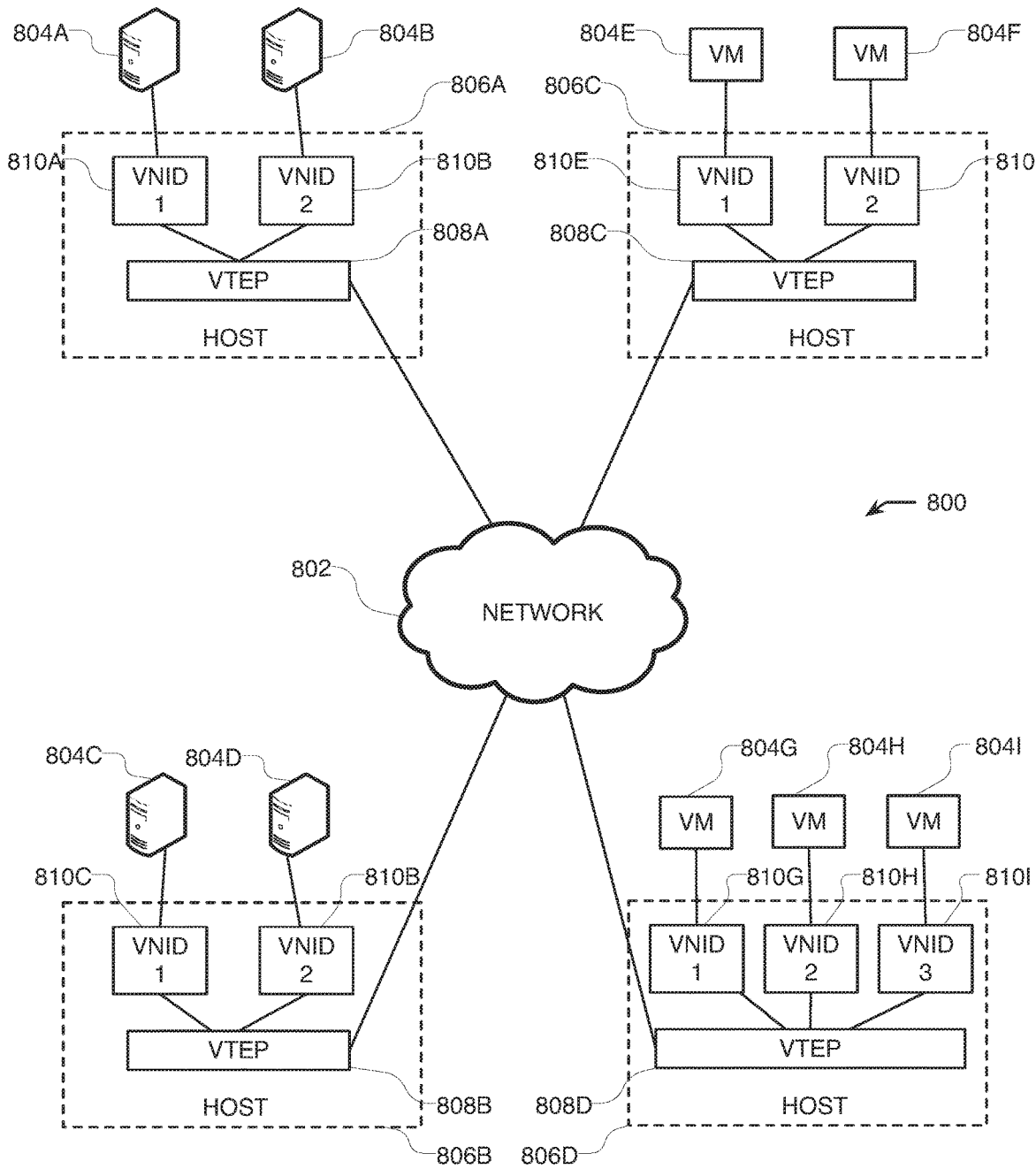
FIG. 8 illustrates an example overlay network.

FIG. 8 illustrates an exemplary overlay network 800. Overlay network 800 uses an overlay protocol, such as VXLAN, VGRE, VO3, or STT, to encapsulate traffic in L2 and/or L3 packets which can cross overlay L3 boundaries in the network. As illustrated in FIG. 8, overlay network 800 can include hosts 806A-D interconnected via network 802.

Network 802 can include a packet network, such as an IP network, for example. Moreover, network 802 can connect the overlay network 800 with the fabric 312 in FIG. 3. For example, VTEPs 808A-D can connect with the leaf switches 304 in the fabric 312 via network 802.

Hosts 806A-D include virtual tunnel end points (VTEP) 808A-D, which can be virtual nodes or switches configured to encapsulate and decapsulate data traffic according to a specific overlay protocol of the network 800, for the various virtual network identifiers (VNIDs) 810A-I. Moreover, hosts 806A-D can include servers containing a VTEP functionality, hypervisors, and physical switches, such as L3 switches, configured with a VTEP functionality. For example, hosts 806A and 806B can be physical switches configured to run VTEPs 808A-B. Here, hosts 806A and 806B can be connected to servers 804A-D, which, in some cases, can include virtual workloads through VMs loaded on the servers, for example.

In some embodiments, network 800 can be a VXLAN network, and VTEPs 808A-D can be VXLAN tunnel end points. However, as one of ordinary skill in the art will readily recognize, network 800 can represent any type of overlay or software-defined network, such as NVGRE, STT, or even overlay technologies yet to be invented.

The VNIDs can represent the segregated virtual networks in overlay network 800. Each of the overlay tunnels (VTEPs 808A-D) can include one or more VNIDs. For example, VTEP 808A can include VNIDs 1 and 2, VTEP 808B can include VNIDs 1 and 3, VTEP 808C can include VNIDs 1 and 2, and VTEP 808D can include VNIDs 1-3. As one of ordinary skill in the art will readily recognize, any particular VTEP can, in other embodiments, have numerous VNIDs, including more than the 3 VNIDs illustrated in FIG. 8.

The traffic in overlay network 800 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 804A-D and VMs 804E-I can connect to their respective VNID or virtual segment, and communicate with other servers or VMs residing in the same VNID or virtual segment. For example, server 804A can communicate with server 804C and VMs 804E and 804G because they all reside in the same VNID, viz., VNID 1. Similarly, server 804B can communicate with VMs 804F, H because they all reside in VNID 2. VMs 804E-I can host virtual workloads, which can include application workloads, resources, and services, for example. However, in some cases, servers 804A-D can similarly host virtual workloads through VMs hosted on the servers 804A-D. Moreover, each of the servers 804A-D and VMs 804E-I can represent a single server or VM, but can also represent multiple servers or VMs, such as a cluster of servers or VMs.

VTEPs 808A-D can encapsulate packets directed at the various VNIDs 1-3 in the overlay network 800 according to the specific overlay protocol implemented, such as VXLAN, so traffic can be properly transmitted to the correct VNID and recipient(s). Moreover, when a switch, router, or other network device receives a packet to be transmitted to a recipient in the overlay network 800, it can analyze a routing table, such as a lookup table, to determine where such packet needs to be transmitted so the traffic reaches the appropriate recipient. For example, if VTEP 808A receives a packet from endpoint 804B that is intended for endpoint 804H, VTEP 808A can analyze a routing table that maps the intended endpoint, endpoint 804H, to a specific switch that is configured to handle communications intended for endpoint 804H. VTEP 808A might not initially know, when it receives the packet from endpoint 804B, that such packet should be transmitted to VTEP 808D in order to reach endpoint 804H. Accordingly, by analyzing the routing table, VTEP 808A can lookup endpoint 804H, which is the intended recipient, and determine that the packet should be transmitted to VTEP 808D, as specified in the routing table based on endpoint-to-switch mappings or bindings, so the packet can be transmitted to, and received by, endpoint 804H as expected.

However, continuing with the previous example, in many instances, VTEP 808A may analyze the routing table and fail to find any bindings or mappings associated with the intended recipient, e.g., endpoint 804H. Here, the routing table may not yet have learned routing information regarding endpoint 804H. In this scenario, the VTEP 808A may likely broadcast or multicast the packet to ensure the proper switch associated with endpoint 804H can receive the packet and further route it to endpoint 804H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A system for migrating a virtual machine, the system comprising:
   at least one processor;
   an interface;
   a local storage device; and
   memory including instructions that, which when executed by the at least one processor, cause the system to:
   select a first data chunk from a virtual machine image, the virtual machine image being divided into a plurality of sequential data chunks including the first data chunk;
   determine a unique identifier for the first data chunk;
   determine whether to send the first data chunk to a remote device based on the unique identifier being known and accessible to the remote device; and
   in response to the first data chunk being known and accessible to the remote device, send, using the interface, the unique identifier to the remote device and suppress the first data chunk from being sent to the remote device, and
   in response to the first data chunk not being currently known and accessible to the remote device, send, using the interface, the first data chunk to the remote device.

2. The system of claim 1, wherein
   the unique identifier is a hash identifier (ID) value, and the hash ID value being a key generated using a key function.

3. The system of claim 2, wherein the memory includes further instructions, which when executed by the at least one processor, further cause the system to:
   responsive to the hash ID value being absent from a hash database, update the hash database with a hash-data pair entry comprising the hash ID value and the first data chunk;
   compress the first data chunk using at least one compression algorithm; and
   send, using the interface, the hash ID value and the compressed first data chunk to the remote device.

4. The system of claim 3, wherein the hash database is prepopulated with a plurality of entries, each entry corresponding to a respective key-value pair, the respective key-value pair comprising a respective hash ID value and a corresponding data chunk from the virtual machine image.

5. The system of claim 3, wherein the memory includes further instructions, which when executed by the at least one processor, further cause the system to:
   select a second data chunk;
   compute a second hash ID value for the second data chunk;

determine whether the second hash ID value is included as part of one of a plurality of hash-data pair entries in the hash database; and upon determining that the second hash ID value is included as part of the one of the plurality of hash-data pair entries in the hash database, send, using the interface, the second hash ID value to the remote device.

6. The system of claim 5, wherein an LBA address of the second data chunk comprises a next sequential address following another LBA address of the first data chunk.

7. The system of claim 1, wherein the remote device is a data center including a cloud deployment.

8. The system of claim 1, wherein the virtual machine image is divided into the plurality of data chunks based at least on a Rabin fingerprinting algorithm.

9. The system of claim 1, wherein the memory includes further instructions, which when executed by the at least one processor, further cause the system to:

send, using the interface, a logical block address corresponding to the first data chunk to the remote device, the logical block address indicating a location on a virtual disk for writing the first data chunk.

10. The system of claim 1, wherein for each sequential data chunk of the plurality of sequential data chunks the system is configured to:

determine a unique identifier for the sequential data chunk;

determine whether to send the sequential data chunk to the remote device based on the unique identifier being known and accessible to the remote device; and in response to the sequential data chunk being known and accessible to the remote device, sending, using the interface, the unique identifier to the remote device and suppress the first data chunk from being sent to the remote device, or in response to the sequential data chunk not being currently known and accessible to the remote device, sending the sequential data chunk to the remote device.

11. A computer-implemented method, comprising:

selecting a first data chunk from a virtual machine image on a first data center providing cloud based services, the virtual machine image being divided into a plurality of sequential data chunks including the first data chunk;

determining a unique identifier for the first data chunk;

determining whether to send the first data chunk to a remote device based on the unique identifier being known and accessible to the remote device; and in response to the first data chunk being known and accessible to the remote device, sending, using the interface, the unique identifier to the remote device and suppress the first data chunk from being sent to the remote device, and in response to the first data chunk not being currently known and accessible to the remote device, sending the first data chunk to the remote device.

12. The computer-implemented method of claim 11, wherein the unique identifier is a hash identifier (ID) value, the hash ID value being a key generated using a key function.

13. The computer-implemented method of claim 12, further comprising:

responsive to the hash ID value being absent from a hash database, updating the hash database with a hash-data pair entry comprising the hash ID value and the first data chunk;

compressing the first data chunk using at least one compression algorithm; and sending the hash ID value and the compressed first data chunk to the remote device.

14. The computer-implemented method of claim 13, further comprising:

selecting a second data chunk;

computing a second hash ID value for the second data chunk;

determining whether the second hash ID value is included as part of one of a plurality of hash-data pair entries in the hash database; and upon determining that the second hash ID value is included as part of the one of the plurality of hash-data pair entries in the hash database, sending the second hash ID value to the remote device.

15. The computer-implemented method of claim 14, wherein an LBA address of the second data chunk comprises a next sequential address following another LBA address of the first data chunk.

16. The computer-implemented method of claim 11, wherein the remote device is data center including a cloud deployment.

17. The computer-implemented method of claim 11, wherein the virtual machine image is divided into the plurality of data chunks based at least on a Rabin fingerprinting algorithm.

18. The computer-implemented method of claim 11, further comprising: sending a logical block address corresponding to the first data chunk to the remote device, the logical block address indicating a location on a virtual disk for writing the first data chunk.

19. A non-transitory computer-readable medium including instructions stored therein that, when executed by at least one computing device, cause the at least one computing device to:

select a first data chunk from a virtual machine image, the virtual machine image being divided into a plurality of sequential data chunks including the first data chunk;

determine a unique identifier for the first data chunk;

determine whether to send the first data chunk to a remote device based on the unique identifier being known and accessible to the remote device stores the first data chunk and/or the second data chunk; and in response to the first data chunk being known and accessible to the remote device, send, using the interface, the unique identifier to the remote device and suppress the first data chunk from being sent to the remote device, and in response to the first data chunk not being currently known and accessible to the remote device, send the first data chunk to the remote device.

20. The non-transitory computer-readable medium of claim 19, wherein the unique identifier is a hash identifier (ID) value for the first data chunk, the hash ID value being a key generated using a key function.

21. The non-transitory computer-readable medium of claim 20, including further instructions that cause the at least one computing device to:

responsive to the hash ID value being first hash database, update the first hash database with a new hash-data pair entry comprising the hash ID value and the first data chunk;

compress the first data chunk using at least one compression algorithm; and send the hash ID value and the compressed first data chunk to the second data center.

* * * * *